United States Patent [19]

Eckels

[11] Patent Number: 4,466,490

[45] Date of Patent: Aug. 21, 1984

[54] HYDRAULIC WEEDER

[76] Inventor: Robert E. Eckels, 49 S. Lookout Mountain Rd., Golden, Colo. 80401

[21] Appl. No.: 423,406

[22] Filed: Sep. 24, 1982

[51] Int. Cl.$^3$ ............................................. A01B 1/16
[52] U.S. Cl. ...................................... 171/50; 7/114; 111/7.1
[58] Field of Search .................................. 171/50-62; 294/50.6; 7/114, 170; 188/166; 24/115 N, 27; 267/155, 157

[56] References Cited

U.S. PATENT DOCUMENTS

| | | | |
|---|---|---|---|
| 772,097 | 10/1904 | Hayes | 171/55 |
| 2,157,915 | 5/1939 | Olson | 294/50.6 |
| 2,860,001 | 11/1958 | Garland | 294/50.6 |
| 3,985,382 | 10/1976 | Wheeler | 294/50.6 |
| 4,188,719 | 2/1980 | Hoff | 56/12.7 |
| 4,322,935 | 4/1982 | Poehlman | 56/11.3 |

FOREIGN PATENT DOCUMENTS 364246  6/1921  Fed. Rep. of Germany .......... 7/114

Primary Examiner—Robert E. Bagwill
Assistant Examiner—D. D. DeMille
Attorney, Agent, or Firm—James E. Pittenger

[57] ABSTRACT

A hydraulic weeding apparatus consisting of an elongated hollow tubular shaft being attached to a hand grip type body having a coupling for attaching the device to a source of pressurized fluid such as a common garden hose. A positionally adjustable, hook-type gripping device is spaced from the open end of said tube and is arranged with an outwardly extending free end which is arranged to encircle and grip the base of a weed root when the shaft is rotated. A splash shield is positioned above the gripping device to prevent the fluid from flowing upwardly along the shaft so as to protect the user. A valve can be provided in the body of the device for controlling the flow of fluid through the tubular shaft whereby the open end of the shaft can be inserted adjacent to the root of a weed to a depth where the gripping device can attach to the loose weed so as to easily remove it.

10 Claims, 5 Drawing Figures

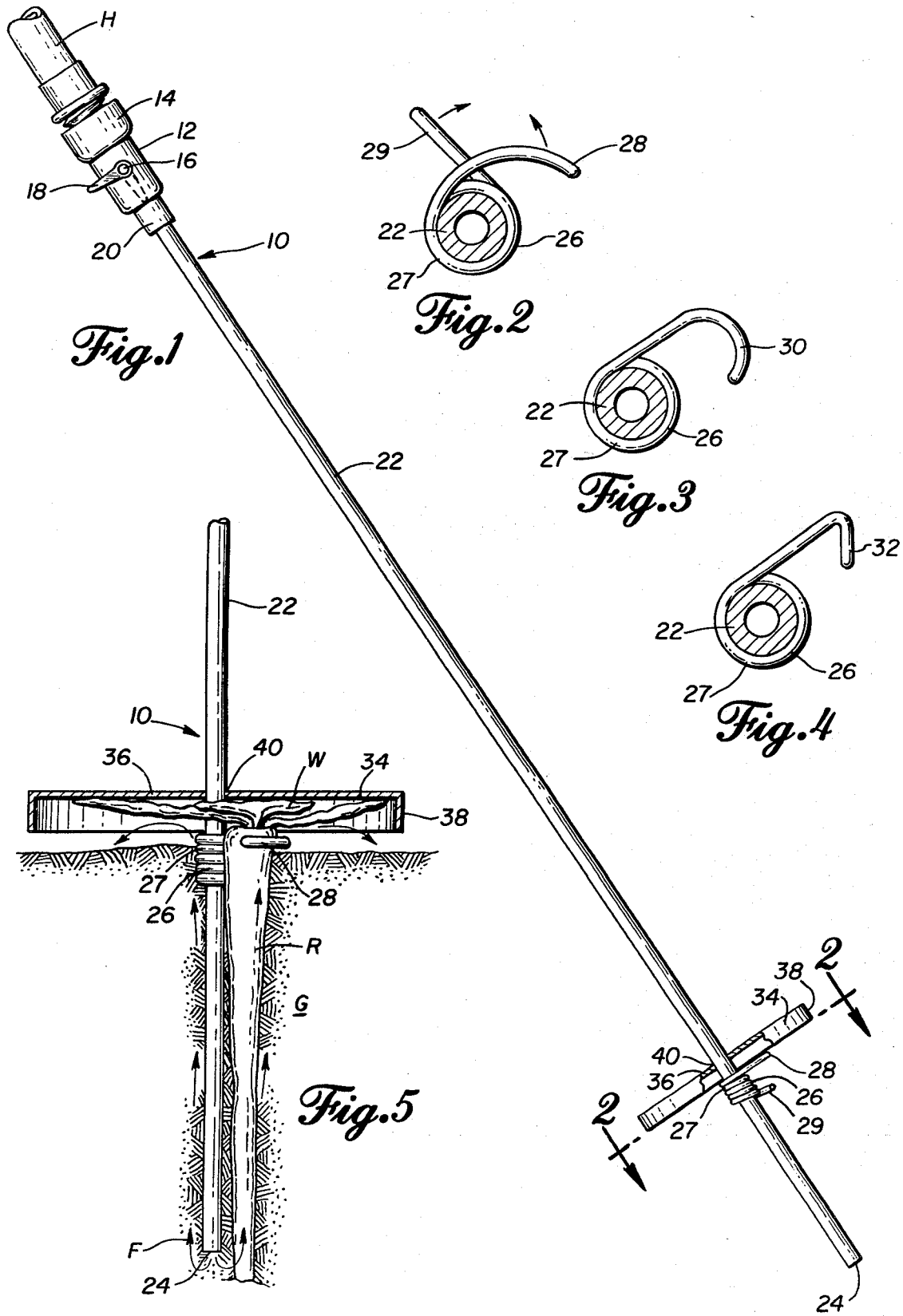

HYDRAULIC WEEDER

FIELD OF THE INVENTION

This invention is directed to a device for removing unwanted vegetation from the soil. It is more specifically directed to an elongated water tube having a weed gripping device for loosening and removing weeds.

BACKGROUND OF THE INVENTION

It has always been a problem to successfully and completely remove weeds and other innocuous plants. Invariably, weeds always grow where they are not wanted, especially in a well-manicured lawn or garden.

It has been a common practice in the past either to chop the weeds as close to the surface of the ground as possible or to pull the weeds by hand. Most of the tenacious type of weeds have a tap root which extends downwardly into the soil for a considerable distance in order to obtain moisture. As is well known, if a substantial portion of this root is allowed to remain in the ground after pulling or cutting the top vegetation, the plant will revive and continue to grow. Thus, the most convenient ways of removing weeds are only temporary and usually allow the weed to eventually flourish.

In order to completely eliminate weeds of this type, it is necessary to apply chemicals or other vegetation destroying herbicides or to completely remove the roots of the plant. The manual removal of the roots is usually accomplished by using a tool having an elongated shaft with a bifurcated cutting fork at the end which is pushed deeply into the ground, hopefully on a path which will intercept and cut the roots at a depth which will prevent them from reviving and rejuvenating.

SUMMARY OF THE INVENTION

The present invention is directed to a new and novel tool for completely loosening the soil around the roots of an unwanted plant or weed in such a manner that the weed can be gripped and easily removed intact from the soil. To accomplish this, a hydraulic-type weeder is provided wherein an elongated open-ended tube is connected to an ordinary garden hose and a positionally adjustable, gripping-type hook for grasping the base and root of the weed is provided. A shield is also included on the tube to prevent the water from being deflected upwardly along the shaft which would soak or spray the user. A convenient on/off valve can be provided in the handle of the tube where it attaches to the hose to conveniently control the flow of water.

By positioning the end of the tube adjacent to the base of the weed to be removed at the same time that water is flowing from the tube, the soil or dirt adjacent to the roots will be loosened and flushed away to free the roots from the surrounding soil. In fact, the hydraulic flushing action of the water eliminates the necessity to force the tube into the ground as is already well known with the use of aerators. Once the tip of the tube has been inserted to a depth approximating the length of the roots, the shaft is rotated so that the gripping hook device will surround and attach itself to the base of the weed allowing the upper movement of the tube to easily and completely remove the weed along with the entire root system.

The device, according to the present invention, can be fabricated from any suitable materials. As an example, the body of the weeder which attaches to the hose can be made from a metallic material or molded from any suitable plastic. The tube can be fabricated from any metal having sufficient strength or can be fabricated from a suitable synthetic resin or plastic depending upon the desired length and the strength required during use. The gripping-type hook can be fabricated from a metallic wire which is shaped and attached to the tube as desired. The water shield can be formed from any easily molded plastic such as polyethylene, polyurethane or polyvinylchloride.

It is to be understood that while reference is made to a specific hydraulic weeder, any other variation of this device which utilizes the hydraulic arrangement for removing weeds and vegetation are intended to be considered a part of this invention.

BRIEF DESCRIPTION OF THE DRAWINGS

Other features and advantages of the present invention will become apparent from the following detailed description of the invention wherein like reference numbers denote the same element in the accompanying drawings.

FIG. 1 shows a side view of the hydraulic weeder according to the present invention, a portion of the water shield is removed for clarity;

FIG. 2 is a cross-sectional view taken along lines 2—2 of FIG. 1 showing the shape of the weed-gripping hook;

FIGS. 3 and 4 show cross-sectional views of additional configurations for the weed-gripping hook; and FIG. 5 shows a pictorial cross-sectional side view of the hydraulic weeder in use and positioned adjacent to the root of a plant to be removed.

DETAILED DESCRIPTION OF THE DRAWINGS

Turning now more specifically to the drawings, FIG. 1 shows an overall view of the hydraulic weeder 10 which is the invention. The device 10 is connected to the hose H which can be of the common garden type which is connected to a source of water or other pressurized fluid. It is to be understood throughout this description that this device is not limited to use solely with water but can be used with any fluid including air, if it is desired. Water seems to be the medium which provides the best results and is most readily available and therefore will be described throughout this specification.

The hydraulic weeder 10 includes the body housing 12 having an axial internal passageway for the fluid. The body 12 is connected to the hose H by means of an internally threaded rotatable cap 14. Usually a washer is included in the cap 14 to provide a tight seal to prevent leaks. An elongated hollow tubular member 22 is connected to the other end of the body 12 by means of a coupling 20. This coupling 20 can provide a permanent attachment for the tube to the body, or if desired, can be a threaded coupling which would allow the tube 22 to be replaced or interchanged, if desired.

For convenience, a shut-off valve 16 having an operating handle 18 can be provided for conveniently controlling the flow of water through the tube during use. The valve 16 can be of any common type such as a ball or cylinder valve having a core closely fitting the internal cavity within the body 12 and having a transverse passageway which can be aligned with the internal passage within the body 12 or turned 90 degrees by the handle 18 to block the flow of fluid.

The tube 22 can be of any convenient length, such as 30 inches, which will allow the user to conveniently position the tip end 24 adjacent to the weed and to insert the tip to a desired depth in the ground without requiring the user to bend over or stoop down.

The weed gripping hook 26 is provided on the shaft of the tube 22 and is attached by any convenient method. The method shown is a wire wrap attachment which is found to be convenient. In this arrangement the wire forming the hook 26 is tightly wrapped around the tube at the desired location forming two, three or more loops 27 which are sufficient to hold the gripping hook 26 in place. The hook 26 is spaced upwardly from the tip 24 of the tube 22 at a distance which is usually established by the type of weeds upon which the device is intended to be used. In actual use it has been found that a distance of six to eight inches is satisfactory for removing dandelion or thistle. If desired, the ends 28, 29 of the wire wrap can be arranged to be squeezed together in the direction of the arrows as seen in FIG. 2 to expand the loops 27 to allow the hook 26 to be positionally adjusted along the length of the tube 22. However, it is to be understood that any other suitable position adjusting arrangement can be substituted where necessary.

A water shield 34 having a flat body 36 with downwardly angled lip or flange 38 is mounted conveniently on the tube 22. An aperture 40 provided in the center portion of the body 36 allows the shield to be threaded onto the tube 22 prior to the attachment of the hook 26. The aperture 40 can be sized to loosely approximate the diameter of the tube 22 to not restrict rotation or sliding movement of the shield 34.

As an alternative, it is also possible that the tube 22 could be slightly tapered with an increased wall thickness or diameter provided at the body end to provide additional strength. The diameter of the aperture 40 can then be sized to allow the shield to move upward on the tube at least a distance of several inches above the hook 26. An outside diameter of six to eight inches has been found to be quite satisfactory for this shield.

The longer free end of the hook 26 can have several different shape variations. In FIG. 2, a spiral end 28 is shown which has been found to be the most desirable. In addition to this, the curved hook end 30 and the angled end 32 has been found to be quite satisfactory. It is to be understood that any free end configuration can be utilized in this invention which will allow the hook to grip the stock or root of the weed so that the entire weed can be removed with the tube. In addition, it is possible to configure both ends of the weed-gripping hook 26 as outwardly extending hooks having the same or different configurations.

OPERATION

In use, the device 10, with the fluid F flowing from the tube 22, is arranged so that the tip 24 is positioned adjacent to the base of the weed W. Through the hydraulic flushing action of the fluid F the ground G around the root R of the weed is loosened and flushed away so as to free the root. It has been found that it is unnecessary to excessively force the tip 24 into the ground since the flushing action of the water or fluid F will allow the tube 22 to easily penetrate into the ground at a reasonable rate. Once the tip 24 has penetrated to a point near root depth, the hook 26 is raised adjacent to the root of the foliage and the tube 22 is rotated so that the free end 28 of the hook encircles and is wedged around the root of the weed. Usually the stock of the weed W above the base is wider than the base allowing the hook 28 to satisfactorily grip the weed W. Since the root R is now relatively free, it is a simple matter to pull the tube 22 so as to simultaneously remove the weed and its roots.

As an added advantage, the hole in the ground which is left after removal of the weed by this method provides an aeration point which allows subsequent water to soak into the ground to a greater depth.

While a novel hydraulic weeder has been shown and described in detail, it is to be understood that this invention is not to be limited to the exact form disclosed, and that changes in detail, form and construction may be made in the invention without departing from the spirit thereof.

What is claimed is:

1. A hydraulic weeding apparatus for completely removing undesirable weeds from the soil, the apparatus comprising:
   (a) an elongated hollow member having a means at one end for attaching to a source of pressurized fluid, the other end being left open to allow the fluid to freely flow from the member;
   (b) a gripping means spaced from said open end and having an outwardly extending hook member arranged to encircle and grip the root of said weed so that the weed can be removed once the root has been loosened by the flow of the fluid; and
   (c) said gripping means is formed from a resilient wire which is tightly wrapped around the outside surface of said elongated member and having outwardly extending free ends, with at least one free end of the wire being shaped to form said hook member, the free ends of said gripping means are arranged so that they can be squeezed toward each other so that the gripping means can be loosened and positionally adjusted along said elongated hollow member depending upon the type of weed intended to be removed.

2. A hydraulic weeding apparatus as defined in claim 1 wherein said attaching means includes a body means having an internal elongated passageway which allows the fluid to pass into said elongated member, and a threaded coupling means provided at the end of said body means for coupling said device to said pressurized source of fluid.

3. A hydraulic weeding apparatus as defined in claim 2 wherein said body means further includes a valve means positioned within the longitudinal passageway whereby the flow of fluid through said elongated member can be controlled.

4. A hydraulic weeding apparatus as defined in claim 1 wherein a shield means is mounted on said elongated member adjacent to said gripping means and on the opposite side from said open end so as to prevent fluid from flowing back along the elongated member from the open end during use.

5. A hydraulic weeding apparatus as defined in claim 4 wherein said shield member is a flat disc having a central aperture sized to loosely fit the outside diameter of said elongated member.

6. A hydraulic weeding device as defined in claim 1 wherein said elongated member has a tapered outside surface, and the end of the member closest to the source of pressurized fluid is larger than the open end.

7. A hydraulic weeding device as defined in claim 1 wherein a body means is provided for interconnecting the elongated member with said pressurized fluid source, said body means having a coupling means whereby the elongated member can be easily removed and replaced from said body means when desired.

8. A hydraulic weeding apparatus as defined in claim 1 wherein at least one free end of said gripping means is arranged in an increasing spiral configuration.

9. A hydraulic weeding apparatus as defined in claim 1 wherein at least one free end of said gripping means is arranged in a semicircular configuration.

10. A hydraulic weeding apparatus as defined in claim 1 wherein at least one free end of said gripping means is arranged to have an acute angle spaced inwardly from the end to form a hook.

* * * * *